United States Patent
Kato (10) Patent No.: US 12,555,348 B2
(45) Date of Patent: Feb. 17, 2026

(54) VIDEO PROCESSING APPARATUS, METHOD FOR CONTROLLING THE SAME, AND NON-TRANSITORY COMPUTER-READABLE STORAGE MEDIUM

(71) Applicant: CANON KABUSHIKI KAISHA, Tokyo (JP)

(72) Inventor: Kimimaru Kato, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 357 days.

(21) Appl. No.: 18/318,070

(22) Filed: May 16, 2023

(65) Prior Publication Data
US 2023/0419738 A1    Dec. 28, 2023

(30) Foreign Application Priority Data
Jun. 28, 2022  (JP) .................. 2022-103907

(51) Int. Cl.
G06V 10/56   (2022.01)
G06V 20/40   (2022.01)
G06V 40/16   (2022.01)
G06V 40/40   (2022.01)
H04N 1/60    (2006.01)

(52) U.S. Cl.
CPC .............. *G06V 10/56* (2022.01); *G06V 20/46* (2022.01); *G06V 40/168* (2022.01); *G06V 40/45* (2022.01); *H04N 1/60* (2013.01)

(58) Field of Classification Search
CPC ...... G06V 10/56; G06V 40/168; G06V 20/46; G06V 40/45
See application file for complete search history.

(56) References Cited

U.S. PATENT DOCUMENTS
2018/0068171 A1* 3/2018 Jones ................... G06V 40/168
2020/0337573 A1* 10/2020 Fukuda ................ A61B 5/0261

FOREIGN PATENT DOCUMENTS
JP          6544244 B2      7/2019
WO     2015/122183 A1     8/2015

OTHER PUBLICATIONS

Rahmat, Romi Fadillah, et al. "Skin color segmentation using multi-color space threshold." IEEE, published 2016 (Year: 2016).*
Rahmat Fadillah, et al. "Skin color segmentation using multi-color space threshold." IEEE (Year: 2016).*

* cited by examiner

Primary Examiner — Ross Varndell
Assistant Examiner — Nhut Huy Pham
(74) Attorney, Agent, or Firm — Cowan, Liebowitz & Latman, P.C.

(57) ABSTRACT

The present invention provides a technique for determining whether an object is a living body with a high degree of accuracy even for a relatively short video of about one second. To achieve this, a video processing apparatus configured to determine whether an object is a living body from video data of the object constituted by a plurality of frames, comprises a correction unit configured to correct each of the plurality of frames constituting the video data based on a correction coefficient for correcting to colors of a plurality of target hues different from each other; and a determination unit configured to determine whether the object is a living body based on an average hue value of a skin area of the object in each of the plurality of frames being corrected.

10 Claims, 10 Drawing Sheets

| R TARGET VALUE | G TARGET VALUE | B TARGET VALUE | H TARGET VALUE |
|---|---|---|---|
| 127 | 63 | 63 | 0 |
| 127 | 74 | 63 | 10 |
| 127 | 85 | 63 | 20 |
| 127 | 95 | 63 | 30 |
| 127 | 106 | 63 | 40 |
| 127 | 116 | 63 | 50 |
| 127 | 127 | 63 | 60 |
| 116 | 127 | 63 | 70 |
| 106 | 127 | 63 | 80 |
| 95 | 127 | 63 | 90 |
| 85 | 127 | 63 | 100 |
| 74 | 127 | 63 | 110 |
| 63 | 127 | 63 | 120 |
| 63 | 127 | 74 | 130 |
| 63 | 127 | 85 | 140 |
| 63 | 127 | 95 | 150 |
| 63 | 127 | 106 | 160 |
| 63 | 127 | 116 | 170 |
| 63 | 127 | 127 | 180 |
| 63 | 116 | 127 | 190 |
| 63 | 106 | 127 | 200 |
| 63 | 95 | 127 | 210 |
| 63 | 85 | 127 | 220 |
| 63 | 74 | 127 | 230 |
| 63 | 63 | 127 | 240 |
| 74 | 63 | 127 | 250 |
| 85 | 63 | 127 | 260 |
| 95 | 63 | 127 | 270 |
| 106 | 63 | 127 | 280 |
| 116 | 63 | 127 | 290 |
| 127 | 63 | 127 | 300 |
| 127 | 63 | 116 | 310 |
| 127 | 63 | 106 | 320 |
| 127 | 63 | 95 | 330 |
| 127 | 63 | 85 | 340 |
| 127 | 63 | 74 | 350 |

| ILLUMINATION COLOR TEMPERATURE | DISCRIMINATOR |
|---|---|
| LESS THAN 4000K | MODEL 1 |
| GREATER THAN OR EQUAL TO 4000K, LESS THAN 6000K | MODEL 2 |
| AT LEAST 6000K | MODEL 3 |

FIG. 11B

| | | ILLUMINANCE | | |
|---|---|---|---|---|
| | | LESS THAN 300lx | GREATER THAN OR EQUAL TO 300lx, LESS THAN 600lx | AT LEAST 600lx |
| ILLUMINATION COLOR TEMPERATURE | LESS THAN 4000K | MODEL 1 | MODEL 4 | MODEL 7 |
| | GREATER THAN OR EQUAL TO 4000K, LESS THAN 6000K | MODEL 2 | MODEL 5 | MODEL 8 |
| | AT LEAST 6000K | MODEL 3 | MODEL 6 | MODEL 9 |

VIDEO PROCESSING APPARATUS, METHOD FOR CONTROLLING THE SAME, AND NON-TRANSITORY COMPUTER-READABLE STORAGE MEDIUM

BACKGROUND OF THE INVENTION

Field of the Invention

The present invention relates to a video processing apparatus, a method for controlling the same, and a non-transitory computer-readable storage medium.

Description of the Related Art

In biometric authentication, using a man-made object to fraudulently authenticate as another person has become a problem. Typical examples include presenting a photograph or the like of a face of another person to a camera in an image-based face authentication system, and an act of presenting an object imitating a fingerprint of another person to a fingerprint scanner in a fingerprint authentication system.

As a countermeasure against above-described spoofing, there are a determination method of observing a 3D shape of an authentication target using a distance measuring sensor, and a method of observing, from a video, a change in color in the skin of an object due to pulsation to distinguish whether the object is a living body or a non-living body. The former determination method using the distance measuring sensor cannot cope with spoofing in which a mask is used to imitate the three dimensional face structure of another person. On the other hand, the latter spoofing determination method based on the pulsation can cope with spoofing using a mask to imitate the three dimensional face structure, and thus is advantageous.

Document: Japanese Patent No. 6544244 discloses a technique of acquiring a frequency spectrum from color information of a green component and a blue component of a skin area of an object from a video, and determining spoofing based on the frequency spectrum.

The spoofing determination method based on the frequency spectrum acquired from the color information has a problem in that the determination takes a long time for the following reason.

In a case where the frequency spectrum is obtained from time-series data on a computer, a fast Fourier transform (FFT) is generally used. If a data length of the time-series data is not sufficient, an original component of a frequency band spreads, on the frequency spectrum acquired by FFT, to a frequency band in the vicinity. For this reason, in the time-series data having a small number of samples and a short data length, a frequency component due to pulsation and other frequency components due to noise are mixed on the frequency spectrum, and it is difficult to accurately determine spoofing. In order to acquire a frequency spectrum in which the frequency component of the pulsation and the frequency components of the noise can be distinguished, time-series data having a data length of at least from about three seconds to about five seconds is required.

This is the reason why it takes a long time in the case where the frequency spectrum acquired from the color information is used for the spoofing determination.

If the spoofing determination takes time, a person to be authenticated by the biometric authentication system may be required to maintain a stationary posture during a period of the determination, and inconvenience is imposed in some cases. In addition, such a waiting time may not be tolerable in a gate entry/exit system using face authentication.

SUMMARY OF THE INVENTION

The present invention provides a technique for determining whether an object is a living body with a high degree of accuracy even for a relatively short video of about one second.

According to an aspect of the invention, there is provided a video processing apparatus configured to determine whether an object is a living body from video data of the object constituted by a plurality of frames, comprising: a processor; and a memory storing instructions which, when read and executed by the processor, cause the apparatus to function as: a correction unit configured to correct each of the plurality of frames constituting the video data based on a correction coefficient for correcting to colors of a plurality of target hues different from each other; and a determination unit configured to determine whether the object is a living body based on an average hue value of a skin area of the object in each of the plurality of frames being corrected.

According to the present invention, whether an object is a living body can be determined with a high degree of accuracy even for a relatively short video of about one second.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Figure 1:
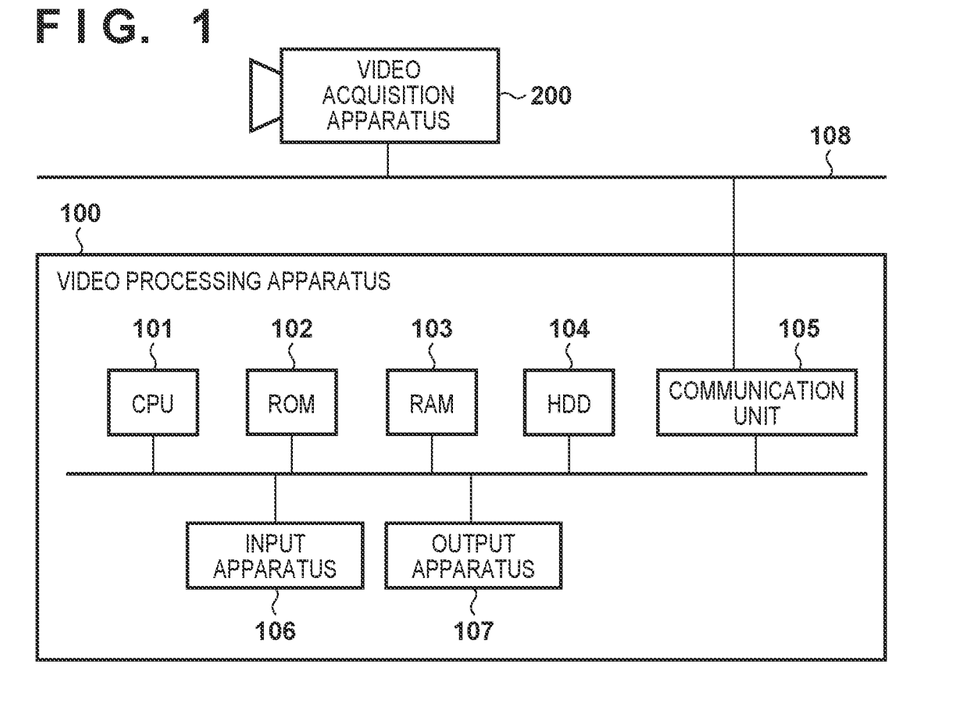
FIG. 1 is a block diagram illustrating an exemplary hardware configuration of a video processing apparatus.

FIG. 1 is a diagram illustrating a system configuration according to an embodiment, in particular, an example of a hardware configuration of a video processing apparatus 100. The present system includes a video acquisition apparatus 200 configured to acquire video data by imaging an object, a network 108, and the video processing apparatus 100 that is a feature of the embodiment. For example, when a person to be the object is detected or when the person as the object performs a predetermined operation (for example, an operation of pressing a predetermined button, an operation of inserting an authentication card, or the like), the video acquisition apparatus 200 starts imaging for transmission and transmits video data having a predetermined time length to the video processing apparatus 100 via the network 108. Note that this time length can be appropriately set by an administrator or the like.

The video processing apparatus 100 includes a CPU 101, a ROM 102, a RAM 103, a hard disk drive (HDD) 104, a communication unit 105, an input apparatus 106, and an output apparatus 107. The communication unit 105 is connected to the network 108.

The CPU 101 reads out a control program recorded in the ROM 102 and executes various processing. The RAM 103 is used as a temporary storage area, such as a main memory or a work area. The HDD 104 is used for long-term data hold. The communication unit 105 is a circuit that performs communication via the network 108. The input apparatus 106 is an apparatus configured to input an instruction and data to the video processing apparatus 100 from the outside. Specifically, the input apparatus 106 is a camera configured to acquire a video, or a keyboard, a mouse, a touch panel, or the like configured to receive an input from a user. The output apparatus 107 is an apparatus configured to output an instruction and data from the video processing apparatus 100 to the outside. Specifically, the output apparatus 107 is a display device such as a display that displays a result, an interface configured to output a determination result to an external apparatus, or the like.

Note that the video processing apparatus 100 need not necessarily include all the units illustrated in FIG. 1 when the units are not functionally necessary. For example, when all inputs/outputs are performed using different devices connected to each other via the network 108, the input apparatus 106 and the output apparatus 107 are not necessary. In addition, a unit not illustrated in FIG. 1 may be included. For example, the video processing may be executed by a graphical processing unit (GPU) or a field programmable gate array (FPGA).

As described above, the hardware configuration of the video processing apparatus 100 includes the similar hardware configuration elements as those of a hardware configuration mounted on a personal computer (PC). Thus, various functions realized by the video processing apparatus 100 can be implemented as software operating on the PC. The video processing apparatus 100 can realize various functions of the video processing apparatus 100 and flowcharts described below by the CPU 101 executing a program.

A general method of calculating a hue H (hue) from values indicating a red (R) component, a green (G) component, and a blue (B) component will be described with reference to FIG. 2.

Pixels constituting a digital color image are often represented by luminance values of respective components of RGB. When the hue H is calculated from the RGB luminance information, the following method is generally used.

First, on the two dimensional plane illustrated in FIG. 2, an R vector 201, a G vector 202, and a B vector 203 are defined as follows. A direction of the vector 201 of the R component is 0° (horizontal direction in the drawing), and a magnitude thereof is R luminance. A direction of the vector 202 of the G component is 120° (counterclockwise angle from the horizontal axis), and a magnitude thereof is G luminance. A direction of the vector 203 of the B component is 240° and a magnitude thereof is B luminance. Then, one pixel can be specified by a sum vector 204 of the R vector 201, the G vector 202, and the B vector 203. At this time, a direction of the sum vector 204 (angle with respect to an R axis indicated by a reference numeral 205 in the drawing) is the hue H.

As described above, a change in the hue H of a pixel of interest in the image becomes remarkable when there is a time-series color change in a direction close to a right angle with respect to the direction of the sum vector 204, and the change in the hue H is detectable with a high degree of accuracy.

For example, a case where only the luminance value of the G component among the RGB components changes in time-series will be considered. In this case, an image represented by a hue at 30° or 210° (directions perpendicular to 120° which is the direction of the G vector 202) which are directions orthogonal to the direction represented by the luminance of the G component is an image sensitive to a change of the G component in time-series. On the other hand, in a case of an image represented by a hue close to 120° or 300° (directions parallel to 120° which is the direction of the G vector 202), a change in hue with respect to the change of the G component in time-series is small, and detection of a hue change may be difficult.

Figure 2:
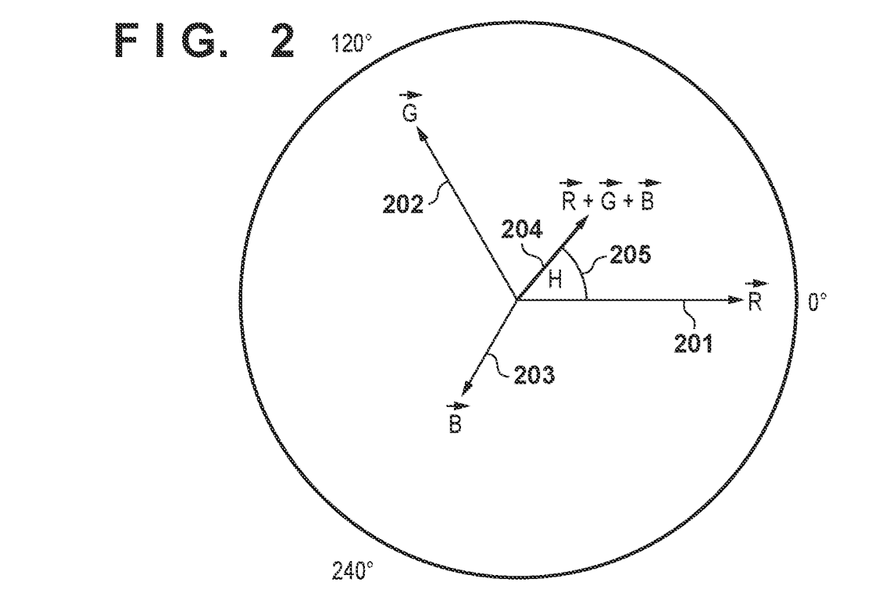
FIG. 2 is a conceptual diagram of a method for calculating a hue H from RGB.

From this consideration, when a color change of human skin due to pulsation is close to a right angle with respect to the direction of the sum vector 204 in FIG. 2, the change due to the pulsation included in the time-series data of H becomes large, and can be detected with a high degree of accuracy.

In the present embodiment, the skin color in the image is corrected to a plurality of target hue values, and then a magnitude of a displacement of the time-series data of H in each case is observed, and thus it is distinguished whether the color change due to the pulsation is included.

In the present embodiment, it is not distinguished whether there is a periodic component due to the pulsation in the color change, but it is distinguished whether a changing color is likely to be the pulsation. Thus, long-time data including a plurality of pulse waveforms is not necessary, and it can be distinguished by the short video data of about one second.

First Embodiment

Figure 3:
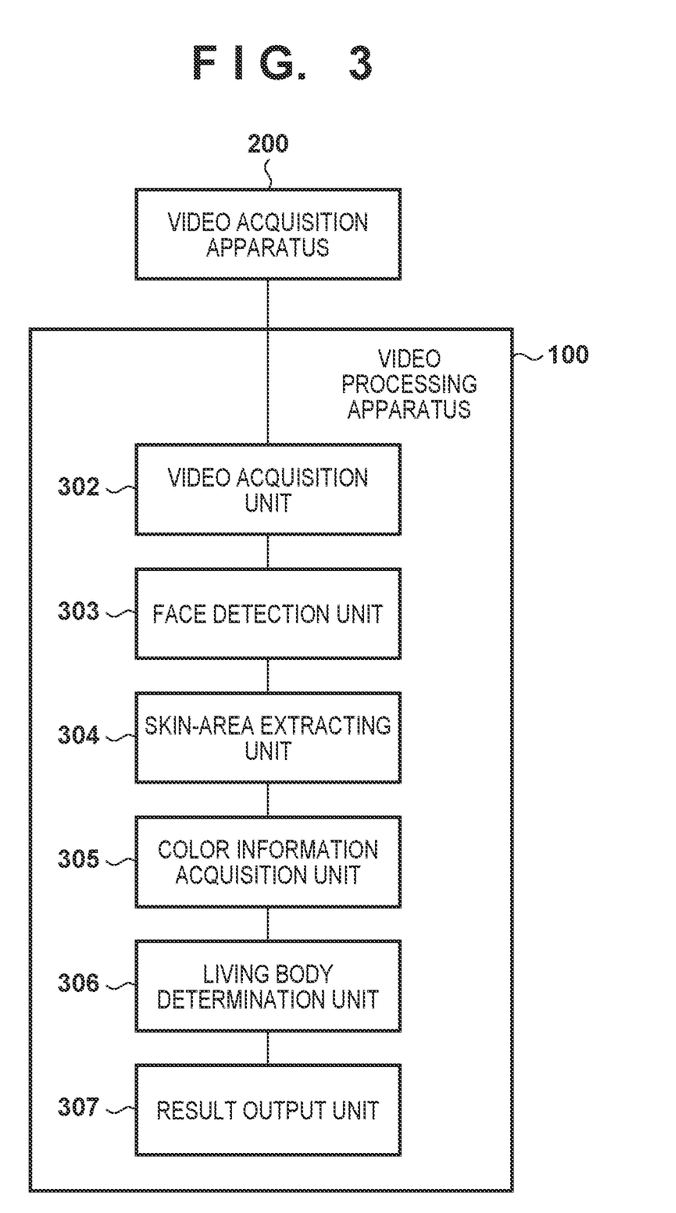
FIG. 3 is a functional configuration diagram of a video processing apparatus according to a first embodiment.

FIG. 3 is a functional configuration diagram of the video processing apparatus 100 in FIG. 1 according to an embodiment. Each block illustrated here can be realized by elements, such as a CPU of a computer, or mechanical apparatuses in terms of hardware, and can be realized by a computer program or the like in terms of software. Here, the functional blocks realized by cooperation thereof are illustrated. Thus, it will be understood by those skilled in the art upon reading this specification that these functional blocks can be realized in various forms by a combination of hardware and software.

The video processing apparatus 100 includes a video acquisition unit 302, a face detection unit 303, a skin-area extraction unit 304, a color information acquisition unit 305, a living body determination unit 306, and a result output unit 307. The video processing apparatus 100 is connected to the video acquisition apparatus 200 via the network 108. Note that the video acquisition apparatus 200 may be connected via an input/output interface included in the input apparatus 106 and the output apparatus 107, instead of the network 108. Further, the video acquisition apparatus 200 may be provided in the video processing apparatus 100 to be a configuration element of the video processing apparatus 100.

Now, each unit will be described. The video acquisition apparatus 200 is an imaging apparatus represented by a video camera. The video acquisition apparatus 200 images an object to be a target of living body determination, and transmits video data having a predetermined time to the video processing apparatus 100 via the network 108. An imaging frame rate of the video acquisition apparatus 200 is, for example, 10 frames/second. When transmitting the imaged video, the video acquisition apparatus 200 may apply, in order to reduce the transmission data amount, moving image encoding of any format such as Motion JPEG and H.264.

The video acquisition unit 302 acquires video data from the video acquisition apparatus 200 via the network 108. In a case where the acquired video data is encoded, the video acquisition unit 302 performs decoding processing. In any case, the video acquisition unit 302 supplies the received video data to the face detection unit 303.

The face detection unit 303 detects a face of the object in the frame of the video data received from the video acquisition unit 302. Any method can be used to detect the face. For example, the face detection unit 303 may use a detector that has learned by deep learning and detects an area of the face of a person from an image. As a representation of a detection result on the computer, coordinates having a rectangular shape including the face in the image without excess or deficiency are generally acquired for each frame in the video, but other forms may be used. Note that in the embodiment, the face detection unit is included in consideration of an application in which the living body determination is used in a face authentication system. In a case where the living body determination of the present invention is used in an authentication system other than the face authentication, such as fingerprint authentication, a functional unit configured to extract a target area according to an authentication method may be included.

The skin-area extraction unit 304 extracts a skin area in units of pixel for the face area of the video and supplies information indicating the extracted skin area to the color information acquisition unit 305. Any method can be used to extract the skin area. For example, a color representation of the video may be converted into an HSV format, and a group of pixels in which each of H, S, and V has a value within a predetermined specific range may be set as the skin area. Alternatively, on the assumption that the skin area occupies a large part of the face area, it is also possible to exclude pixels that are statistical outliers from the H, S, and V values of all the pixels in the face area and set a group of the remaining pixels as the skin area. In addition, it is also possible to use an extractor that has learned by deep learning and extracts the skin area of the person in units of pixels. As a representation of the result of the skin-area extraction on the computer, a "masked image" can be used in which values of pixels that are in the skin area are set to 1 and values of the other pixels are set to 0.

Figure 7:
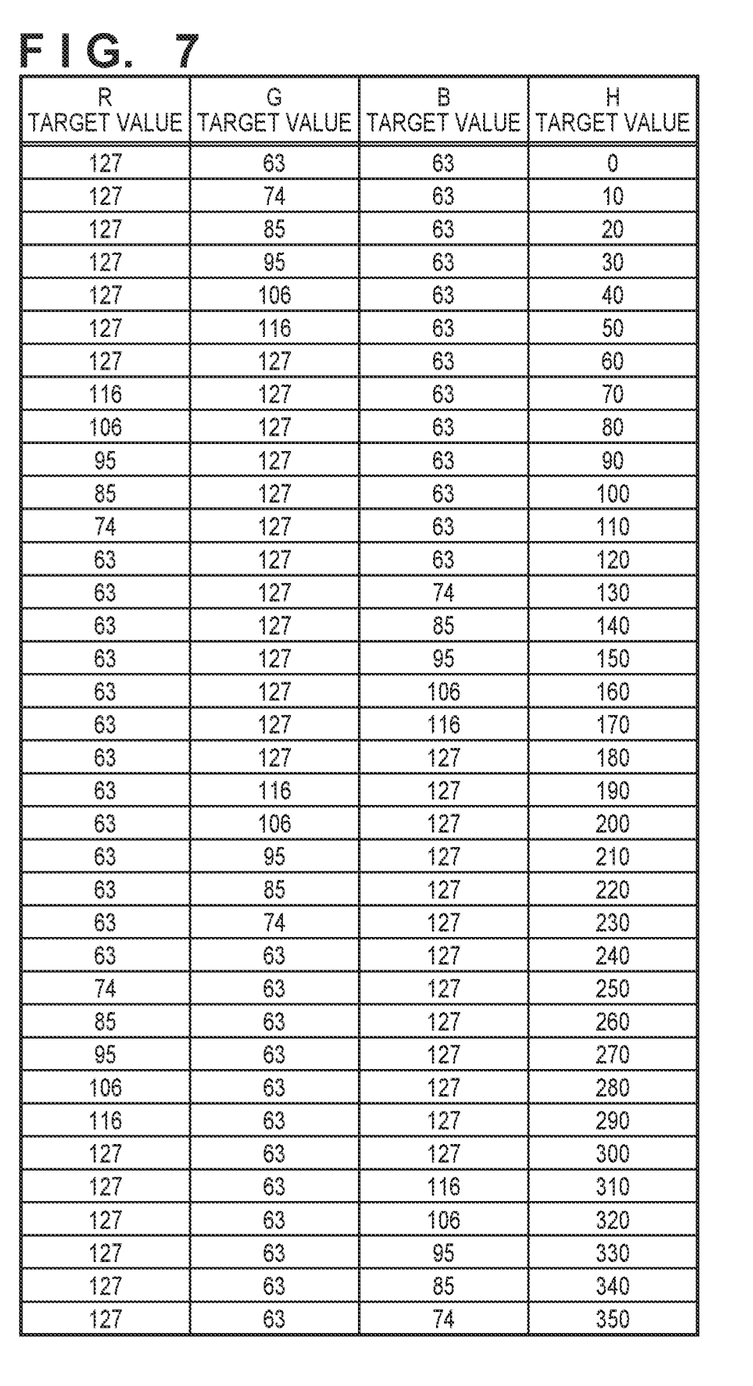
FIG. 7 is a diagram illustrating a table representing correspondence between target values of hues and target values of RGB.

The color information acquisition unit 305 performs color correction on each pixel based on the information from the skin-area extraction unit 304 such that the color of the skin area of the video becomes a value around a predetermined target hue value. Then, the color information acquisition unit 305 acquires an average hue value based on the pixels after color correction in the skin area. The color correction is performed by multiplying each pixel value of RGB by a correction coefficient. The correction coefficient is calculated using an average value of each of RGB of the skin area in a predetermined frame in the video and a target value of each of RGB set in advance. The target value of each component of RGB is decided from a target hue of H based on a correspondence table (stored in the HDD 104) as illustrated in FIG. 7. A plurality of the target hue values are determined, and the color information acquisition unit 305 performs color correction processing and processing for acquiring the average hue values for the plurality of target hue values. A specific method according to an embodiment will be described below with reference to a flowchart.

The living body determination unit 306 performs a living body determination based on time-series data of average hue values. The living body determination is performed by using a discriminator that applies amplitudes of the time-series data of a plurality of the average hue values by the plurality of target hue values as a feature amount. A specific method of the living body determination will be described later with reference to a flowchart.

The result output unit 307 outputs the determination result (information indicating whether the object is a living body) detected by the living body determination unit 306. For example, the determination result is displayed on a display connected as the output apparatus 107. As another example, when cooperating with the face authentication system, information indicating whether the object is a living body is transmitted to face authentication processing separately executed on the video processing apparatus 100 or on another processing apparatus connected via the network 108.

Figure 4:
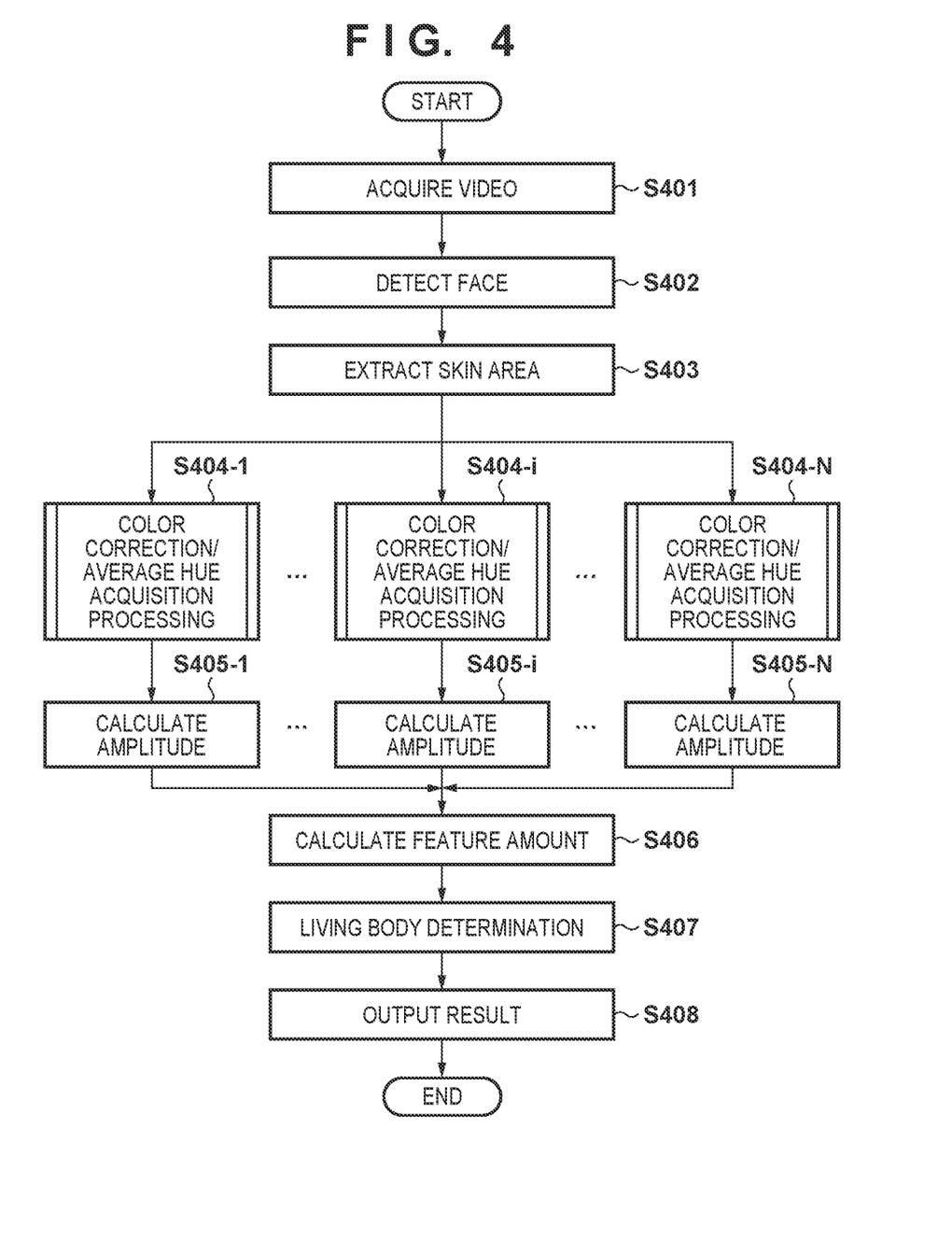
FIG. 4 is a flowchart illustrating a processing procedure of the video processing apparatus according to the first embodiment.

FIG. 4 is a flowchart illustrating processing executed by the video processing apparatus 100 according to the embodiment. Hereinafter, the living body determination processing by the video processing apparatus 100 will be described with reference to FIG. 4. In the following description, each process (step) is denoted by adding "S" to a head of the process (step) to omit a notation of the processing (step). However, the video processing apparatus 100 need not necessarily perform all the steps illustrated in the flowchart.

After the processing starts (for example, after a power supply of the video processing apparatus 100 is turned on), in S401, the video acquisition unit 302 acquires video data acquired by imaging the object from the video acquisition apparatus 200.

In S402, the face detection unit 303 performs face detection of the object in the acquired video data. The face detection unit 303 outputs, as the detection result, information specifying a position and a size of a rectangle (typically, a circumscribing rectangle) including the detected face without excess or deficiency. Note that the size and position of the rectangle may be coordinates of the upper left corner and the lower right corner of the shape, or coordinates of the upper left corner and lengths (number of pixels) of horizontal/vertical sides of the rectangle.

In S403, the skin-area extraction unit 304 extracts a skin area for the detected face area. As a result, it is possible to acquire a group of pixels constituting the skin area in the face area for each frame of the video.

Next, the color information acquisition unit 305 performs a plurality of pieces of the color correction/average hue acquisition processing and amplitude calculation processing. In FIG. 4, N pieces of (N≥2) the color correction/average hue acquisition processing for N target hue values are denoted as S404-1 to S404-N.

Although the N pieces of the color correction/average hue acquisition processing are performed in parallel in the flowchart in FIG. 4, the processing may be sequentially performed. When N=36, the color correction/average hue acquisition processing is performed on 36 target hue values set from 0° to 350° at an interval of 10°.

Here, the pieces of the processing in S404-1 to S404-N are substantially same as each other and will be described in detail later. The i-th ($1 \leq i \leq N$) processing of S404-$i$ will be briefly described as follows. In S404-$i$, the color information acquisition unit 305 performs the color correction processing and the processing for acquiring the average hue value on the extracted skin area. The color correction processing is the processing of correcting the pixel value of the skin area in order to approximate the average hue value of the skin area to a set target hue value tagH(i). This correction processing is executed for the skin area in each frame of the video data. The processing for acquiring the average hue value is the processing for acquiring an average hue value of the skin area after correction of each frame. In a case where the video data includes, for example, M frames, M average hue values in time-series are obtained by the processing for acquiring the average hue value.

Note that the color information acquisition unit 305 may perform filtering for removing noises of the M average hue values in time-series. For example, a band-pass filter, which passes a particular frequency band (for example from 0.8 Hz to 2.5 Hz) in which a pulse rate of a human is likely to appear, can be applied.

Next, the color information acquisition unit 305 performs amplitude calculation processing for each of the N target hue values tagH(1) to tagH(N). These N pieces of the amplitude calculation processing are denoted as S405-1 to S405-N in FIG. 4.

Here, the processing of the color information acquisition unit 305 in S405-$i$ ($1 \leq i \leq N$) is as follows.

The color information acquisition unit 305 performs processing of subtracting the minimum value from the maximum value of the M average hue values in time-series obtained in S404-$i$, and obtains the subtracted value as an amplitude amp(H(i)) of the target hue tagH(i). The amplitude amp(H(i)) is acquired by the following equation, where the average values of hues in M time-series frames in S404-$i$ are defined as aveH(H(i), 1), aveH(H(i), 2), ..., aveH(H(i), M).

$$amp(H(i)) = \max\{aveH(H(i),1), aveH(H(i),2), \ldots, aveH(H(i),M)\} - \min\{aveH(H(i),1), aveH(H(i),2), \ldots, aveH(H(i),M)\}$$

Where max{ ... } is a function that returns the maximum value in { ... } and min{ ... } is a function that returns the minimum value in { ... }.

Next, in S406, the living body determination unit 306 calculates a feature amount used for the living body determination. Specifically, the living body determination unit 306 calculates a total sum_amp of the N amplitudes amp(H(1)) to amp(H(N)) acquired in S405-1 to S405-N, respectively. Then, the living body determination unit 306 divides each of the amp(H(1)) to amp(H(N)) by the total sum_amp to calculate amplitude ratios amp_r(H(1)) to amp_r(H(N)) as feature amounts. Naturally, the sum of the amp_r(H(1)) to amp_r(H(N)) is "1".

In S407, the living body determination unit 306 determines whether the object captured in the image data is the living body. In this living body determination, a discriminator based on the feature amounts acquired in S406, that is, the amplitude ratios amp_r(H(1)) to amp_r(H(N)) is used. The discriminator is prepared in advance by the following method. A plurality of combinations of a feature amount and a supervisory label representing whether an object is a living body or a non-living body are prepared from a plurality of imaged images, knowledge is acquired from them by machine learning, and a discriminator, in which the feature amount is input and a living body determination result is output, is generated. The discriminator can be configured by, for example, a neural network model or a support-vector machine (SVM).

Note that in a case where the number N of the target hue values is dynamically changed in accordance with a calculation resource as will be described later, a dedicated discriminator may be held for each possible N, and determination may be performed by switching the discriminators in accordance with N. Alternatively, the living body determination unit 306 may use a common discriminator by interpolating the feature amounts by an interpolation method such as linear interpolation and making the number of dimensions of the feature amounts equal to that in a case where the calculation resource is sufficient.

In S408, the result output unit 307 outputs the result of the living body determination acquired in S407.

Figure 5:
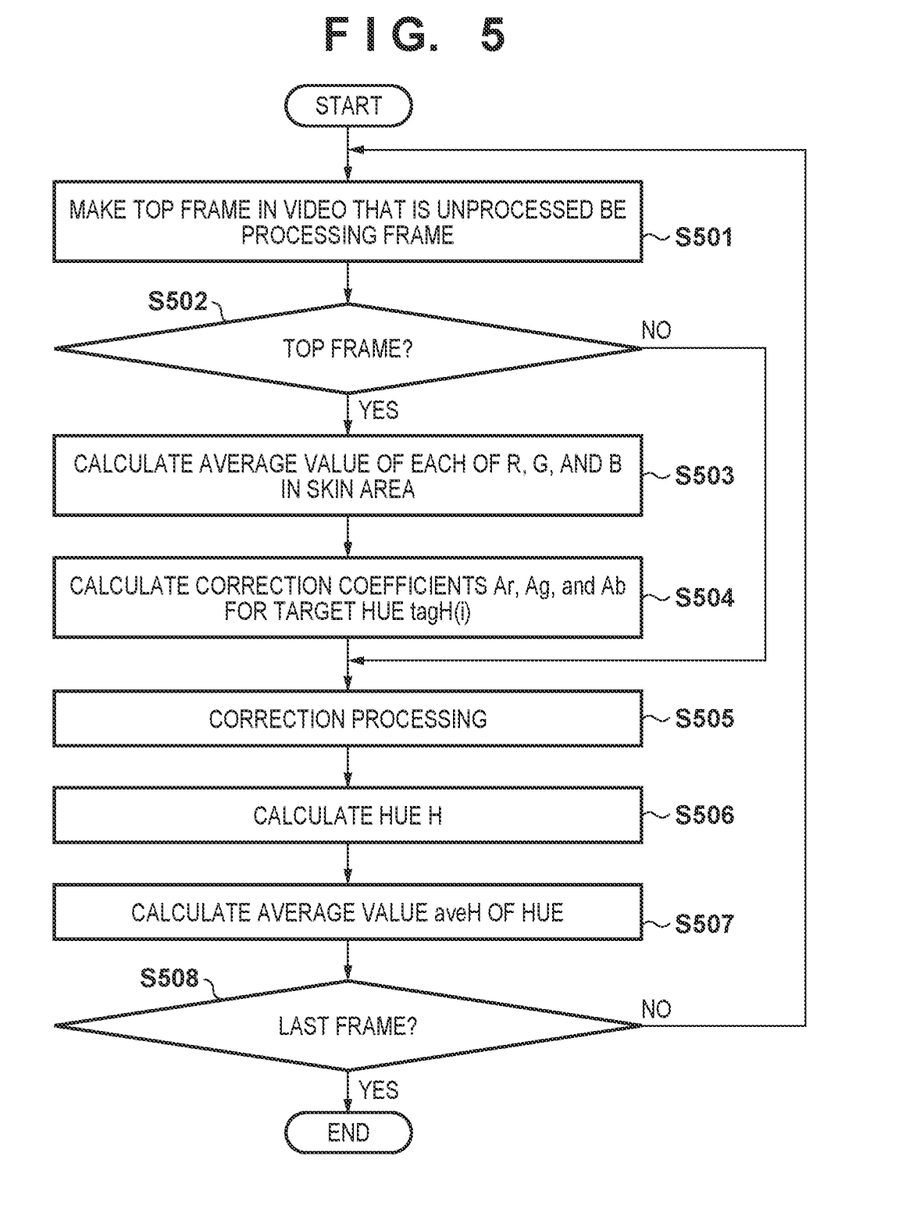
FIG. 5 is a flowchart illustrating a detail of color correction/average hue acquisition processing in FIG. 4.

FIG. 5 is a flowchart illustrating the details in S404-$i$ ($1 \leq i \leq N$) in FIG. 4 performed by the color information acquisition unit 305. Hereinafter, the processing of the color information acquisition unit 305 will be described with reference to FIG. 5.

In S501, the color information acquisition unit 305 acquires one of unprocessed frames in the video. In a case where a frame to be acquired is selected in order from the time-series frames constituting the video data, a top frame of the video data is acquired when S501 is executed first.

In S502, the color information acquisition unit 305 determines whether the acquired frame is the top frame in the video. This is because the top frame is used as a representative frame used for calculating the correction coefficient in the embodiment.

In S502, if the color information acquisition unit 305 determines that the acquired frame is the top frame, then the processing proceeds to S503, and if the color information acquisition unit 305 determines that the acquired frame is a frame other than the top frame, then the processing proceeds to S505.

In S503, the color information acquisition unit 305 obtains average values aveR, aveG, and aveB of the color components R, G, and B, respectively, of a pixel group included in the skin area in the frame of interest as representative colors of the skin area.

In S504, the color information acquisition unit 305 refers to the target hue value tagH(i) and calculates correction coefficients Ar, Ag, and Ab using the following equations (1), (2), and (3), respectively.

[Equation 1]

$$Ar = \frac{tagR}{aveR} \quad (1)$$

[Equation 2]

$$Ag = \frac{tagG}{aveG} \quad (2)$$

[Equation 3]

$$Ab = \frac{tagB}{aveB} \quad (3)$$

Where tagR, tagG, and tagB are RGB component values that are predetermined depending on the target hue value tagH(i). In the embodiment, the correspondence table illustrated in FIG. 7 is stored in the HDD 104 in advance, and the tagR, tagG, and tagB are decided with reference to this table. For example, when the target hue value tagH(i) is "50", tagR is "127", tagG is "116", and tagB is "63". Note that FIG. 7 shows an example of the correspondence between R, G, and B and the target hue values tagH( ) and this need not necessarily be the case.

In S505, the color information acquisition unit 305 corrects the RGB values of each pixel in the skin area of the frame of interest using the correction coefficients Ar, Ag, and Ab, respectively, to approximate the RGB values to the target hue value tagH(i). Specifically, according to the following equations (4), (5), and (6), components of R, G, and B of the pixel in the skin area are multiplied by the correction coefficients Ar, Ag, and Ab, respectively, to acquire values after correction R', G', and B', respectively. Hereinafter, the R', G', and B' are used as the RGB pixel values after color correction of the pixel.

[Equation 4]

$$R' = Ar \times R \quad (4)$$

[Equation 5]

$$G' = Ag \times G \quad (5)$$

[Equation 6]

$$B' = Ab \times B \quad (6)$$

In S506, the color information acquisition unit 305 calculates the hue value H of each pixel after the correction in the skin area. The hue value H is acquired from the following equation (7). However, instead of the R, G, and B values in equation (7), the component values R', G', and B' of the pixel after correction in S505 are used.

[Equation 7]

$$MIN = \min(R, G, B) \quad (7)$$
$$MAX = \max(R, G, B)$$

$$H = \begin{cases} \text{undefined, if } MIN = MAX \\ 60 \times \frac{G-R}{MAX-MIN} + 60, \text{ if } MIN = B \\ 60 \times \frac{B-G}{MAX-MIN} + 180, \text{ if } MIN = R \\ 60 \times \frac{R-B}{MAX-MIN} + 300, \text{ if } MIN = G \end{cases}$$

In S507, the color information acquisition unit 305 calculates an average value aveH(i) of the hue H obtained from each pixel of the skin area.

In S508, the color information acquisition unit 305 determines whether the frame of interest is the last frame in the video. If the color information acquisition unit 305 determines that the frame of interest is not the last frame, that is, that an unprocessed frame remains, then the processing returns to S501 and the next frame is processed. If the color information acquisition unit 305 determined that the frame of interest is the last frame, then the color correction/average hue acquisition processing ends.

As a result of the above, in a case where the video data includes M frames, the color information acquisition unit 305 calculates M aveH(i), that is, aveH(H(i), 1), aveH(H(i), 2), . . . , aveH(H(i), M) in time-series.

In the above-described processing, the correction coefficients Ar, Ag, and Ab of R, G, and B, respectively, are obtained from the top frame of the video, but the correction coefficients may be obtained from a frame other than the top frame, or may be obtained from a plurality of frames. In particular, the average value of RGB in the face area of all frames constituting the video data may be obtained in the S503. However, since it is necessary to decide the correction coefficient in order to perform the processing S505 and after, in a case where a frame other than the top frame of the video data is used in the processing from S502 to S504, the frames to be processed and the order of the processes should be appropriate. For example, in a case where a video imaged in real time is processed, the top frame is preferably used for deciding the correction coefficient as in the embodiment. On the other hand, in a case where the video is once stored in the HDD 104 and processed later, it is also possible to calculate the average values of all the time-series data from the frames of all the video, use the average values to decide the correction coefficient to perform processing in S502 to S504, and then perform the processing S505 and after on each frame. The correction coefficient may be decided using a certain frame of the video, and processing S505 and after may be performed on frames before and after the certain frame using the decided correction coefficient.

Following the above-described processing in S404-i, processing in S405-i is performed. In S405, as described above, an amplitude value ampH(i) is acquired by subtracting the minimum value from the maximum value of the hue average values aveH(H(i), 1), aveH(H(i), 2), . . . , aveH(H(i), M) arranged in time-series.

Then, in S406, the living body determination unit 306 calculates the amplitude ratios amp_r(H(1)) to amp_r(H(N)) of N amplitudes amp(H(1)) to amp(H(N)) acquired in S405-1 to S405-N, respectively, as the feature amounts.

Figure 6A:
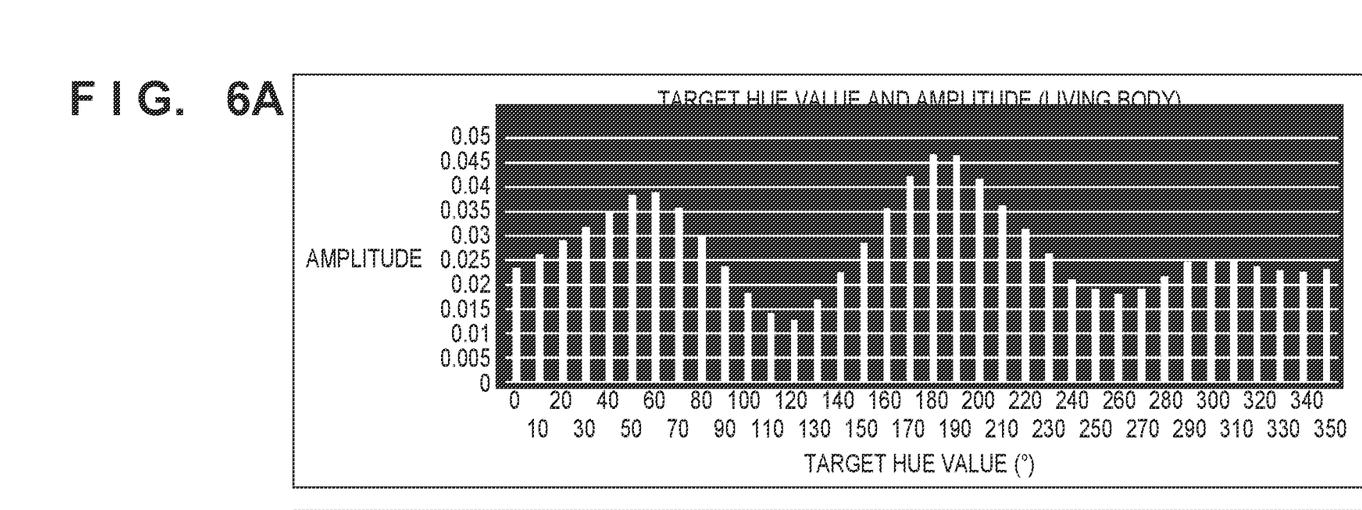
FIGS. 6A and 6B are diagrams illustrating examples of graphs showing feature amounts acquired in the embodiment.
Figure 6B:
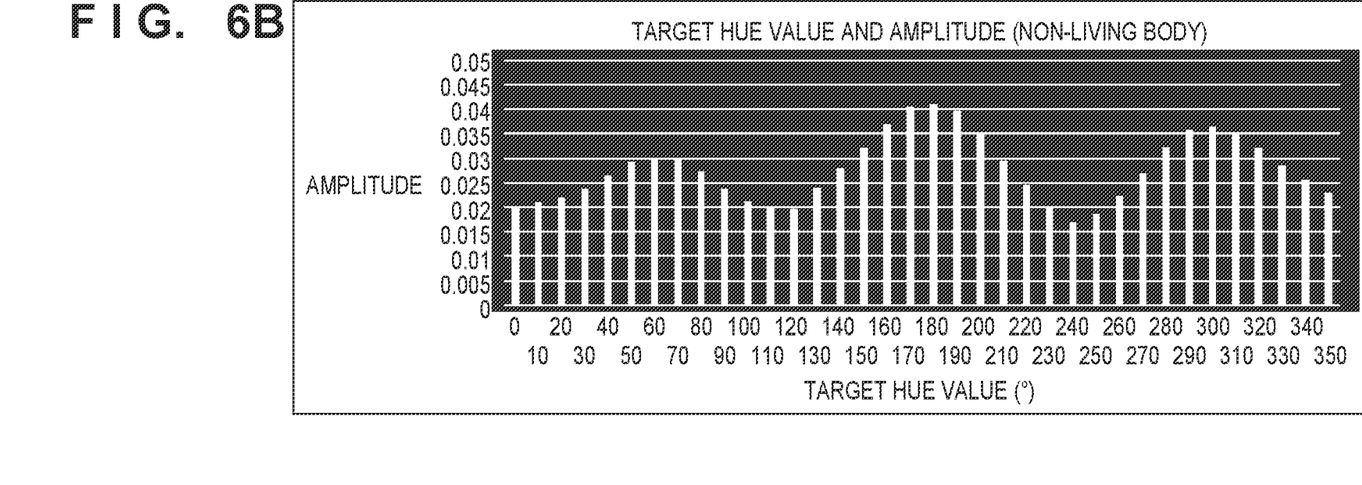

FIGS. 6A and 6B illustrate results obtained by graphing the amplitude ratios amp_r(H(1)) to amp_r(H(N)) which are the feature amounts obtained by the processing described above. The horizontal axis in the drawing represents hue values H( ), and the vertical axis represents the amplitude ratios. Here, the imaging frame rate of the video acquisition apparatus 200 is 10 FPS, and the time length of the video data is one second (that is, the image data acquired by the video acquisition unit 302 includes 10 frames). Since a normal value of a human heart rate is from about 600 to about 90 beats/minute, a time of one second includes a period (from 0.66 to 1.00) of one beat, and thus the one second can be said to be a sufficient time length.

FIG. 6A is a graph of feature amounts acquired from a plurality of moving images of living bodies. FIG. 6B is a graph of feature amounts acquired from a plurality of moving images of non-living bodies. The displacement due to the pulsation largely appears in the G component in an RGB color space. Thus, at the target hue values of 120° and 300° which are parallel to the direction of 120° as the direction of the G component in FIG. 2, the displacement of the G component does not affect the displacement of H. Thus, when the hue is 120° or 300°, the amplitude ratio of a living body is smaller than that of a non-living body. On the other hand, at the target hue values of 30° and 210° orthogonal to the hue 120°, the amplitude ratio of a living body is larger than that of a non-living body. As described above, according to the present invention, the feature amount that can distinguish a living body from a non-living body can be calculated from a relatively short moving video of at most one second.

Although the example is described in the above embodiment in which the number of the target hues is n=36, as can be understood from the above description, even when only three target hue values of 0°, 120°, and 240° are used, whether an object is a living body/non-living body can be determined with sufficient accuracy. As n becomes larger, the accuracy becomes higher, but the processing load becomes larger. Thus, n may be dynamically changed according to the calculation resource on the video processing apparatus 100. For example, in the case where the calculation resource is sufficient, n=36 is similarly set as in FIG. 7, but in a case where the calculation resource is insufficient, such as in a case where the living body determination is simultaneously performed on a plurality of the persons to be authenticated, n=18 may be temporarily set and 18 target hue values may be set from 0° to 340° at an interval of 20°.

As described above, according to the first embodiment, even for input of the relatively short video data such as one second, whether the object is a living body can be determined. That is, even for the relatively short video data, the presence or absence of the spoofing can be determined.

Second Embodiment

In the first embodiment described above, the method has been described in which a living body and a non-living body are distinguished by using the relationship between the target hue and the amplitude of the skin area for each target hue as the feature. However, it is also true that the feature amount is affected by the skin color of a person before correction or a level of a time-series variation of RGB in the skin before correction. For example, there is a case where a tendency of the values in a living body and a non-living body changes due to an environmental condition such as an illumination condition at the time of imaging the video or an influence of an imaging condition such as a characteristic of a camera or setting of white balance. These points will be described in more detail.

Figure 10:
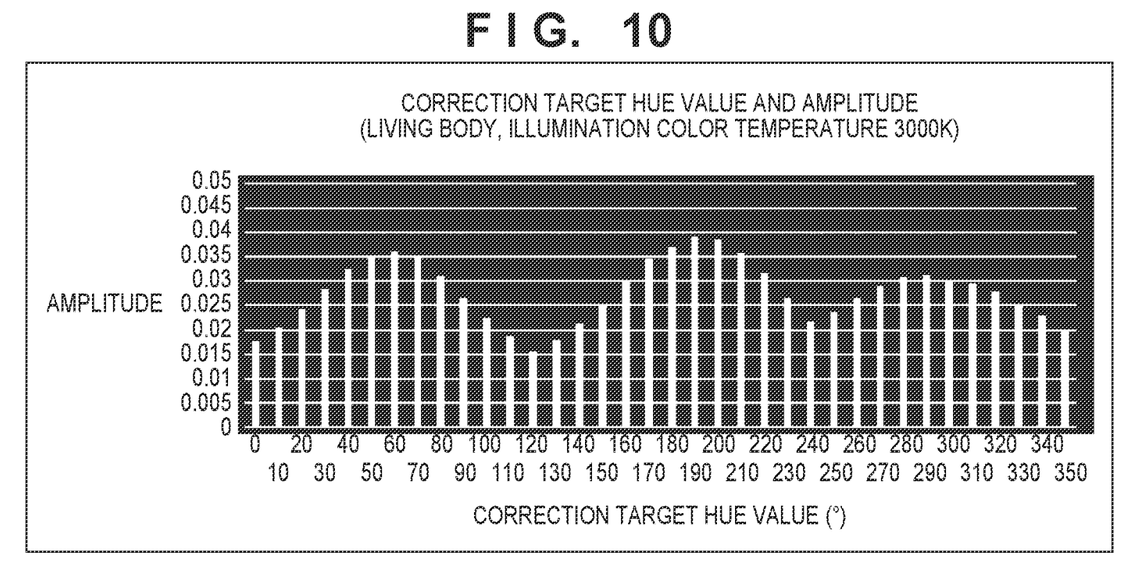
FIG. 10 is a diagram illustrating an example of a graph showing feature amounts.

FIG. 10 is a graph showing an average of feature amounts calculated from a plurality of videos of living bodies as in FIG. 6A. FIG. 6A is the feature amounts of a video imaged under white illumination close to color temperature 5000 K, while FIG. 10 is a feature amounts of a video imaged under incandescent lamp-like color illumination of color temperature 3000 K. In the graph in FIG. 6A, the amplitude ratio at the target hue value 260° is smaller than the amplitude ratios at 250° and 270° in the vicinity of 260°, and is a local minimum value. On the other hand, in the graph in FIG. 10, there is a difference in the tendency of the feature amounts, such that a local minimum value is at the target hue value 240°.

As described above, the tendency of the feature amounts may change due to the influence of the imaging condition. Thus, in a case where the imaging condition of the video data having been used for causing the discriminator used in S407 in FIG. 4 to learn is different from the imaging condition of the video data actually to be used as a determination target, a correct living body determination may not be performed.

Thus, in the second embodiment, as a method of solving the above-described problem, a method of switching the discriminator in accordance with the imaging condition will be described. Note that hereinafter, differences from the first embodiment will be described. It should be understood that the second embodiment is the same as the first embodiment except for the differences.

Figure 8:
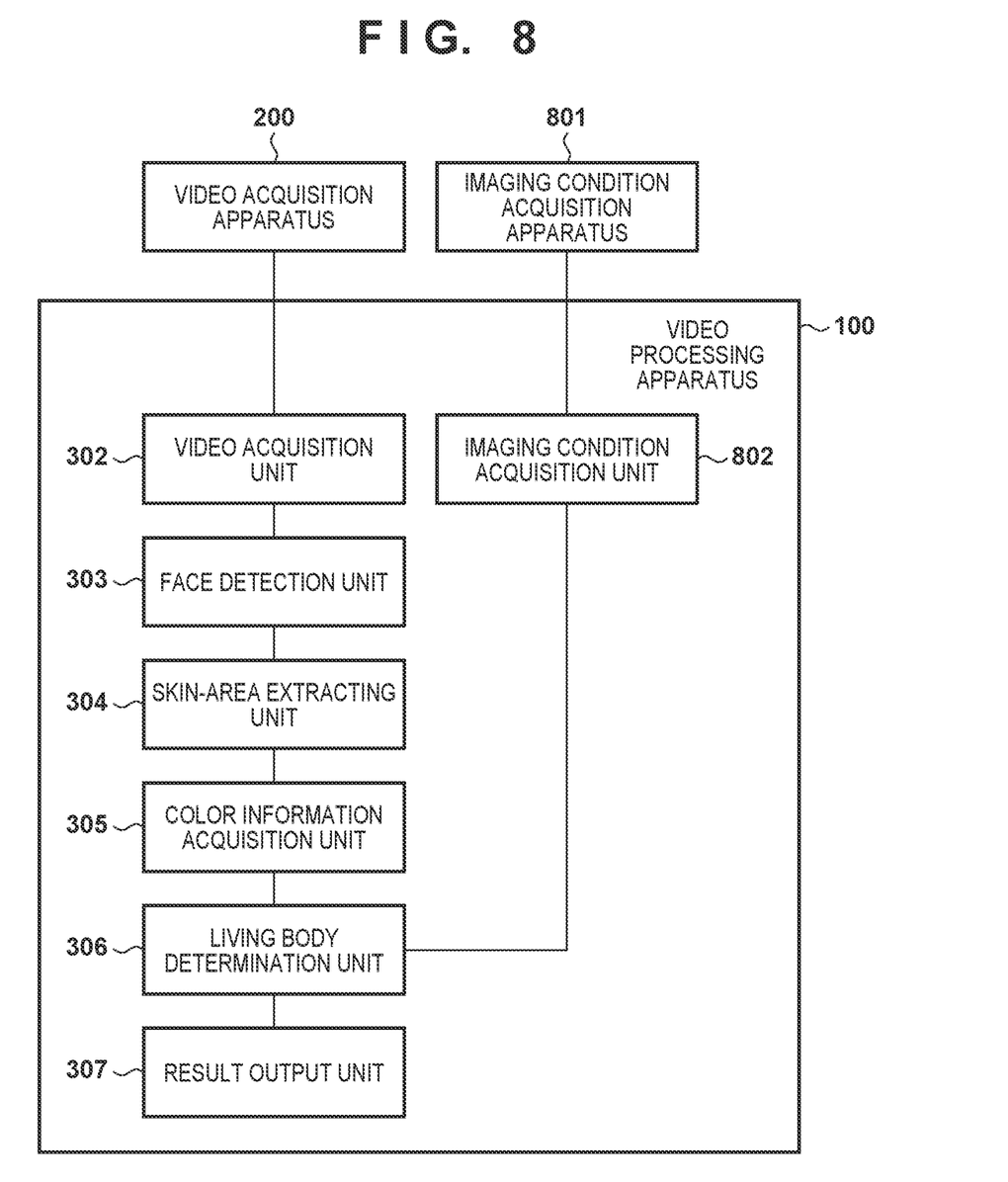
FIG. 8 is a functional configuration diagram of a video processing apparatus according to a second embodiment.

FIG. 8 is a functional configuration diagram of the video processing apparatus 100 according to the second embodiment.

An imaging condition acquisition apparatus 801 is an apparatus configured to acquire an imaging condition at the time of imaging by the video acquisition apparatus 200. Examples of the imaging conditions to be acquired include illuminance, a color temperature, a model of a camera, a white balance setting value of the camera, an exposure setting value of the camera, and combinations thereof. In a case where the model of the camera, the white balance setting value of the camera, and the exposure setting value of the camera are acquired, the video acquisition apparatus 200 also serves as the imaging condition acquisition apparatus 801. When the illuminance or the color temperature is acquired, a dedicated apparatus such as an illuminance meter or a color temperature meter may be prepared as the imaging condition acquisition apparatus 801.

The video processing apparatus 100 is connected to the imaging condition acquisition apparatus 801 via the network 108. Note that the video acquisition apparatus 200 and the imaging condition acquisition apparatus 801 may be connected to each other via an input/output interface included in the input apparatus 106 and the output apparatus 107 instead of the network 108.

An imaging condition acquisition unit 802 acquires the imaging condition from the imaging condition acquisition apparatus 801. For example, in a case where the illuminance meter is used as the imaging condition acquisition unit 802 and an illumination color temperature is acquired as the imaging condition, a sensor reading value of an illumination color temperature meter is acquired as a form of the illumination color temperature. In a case where the video acquisition apparatus 200 also serves as the imaging condition acquisition apparatus 801 and acquires the white balance setting value as the imaging condition, the current white balance setting value (generally, an R gain value and a B gain value) of the video acquisition apparatus 200 is acquired as a form of the white balance setting value.

The living body determination unit 306 includes a plurality of the discriminators having learned in advance in accordance with the imaging conditions (models corresponding to the plurality of discriminators are stored in the HDD 104). Then, the living body determination unit 306 decides or selects a discriminator that has learned under an imaging condition that matches or is closest to the imaging condition acquired by the imaging condition acquisition unit 802. Then, the living body determination unit 306 performs the living body determination by applying the amplitudes of the time-series data of the plurality of average hue values by the plurality of target hue values to the decided discriminator as the feature amounts.

Figure 11A:
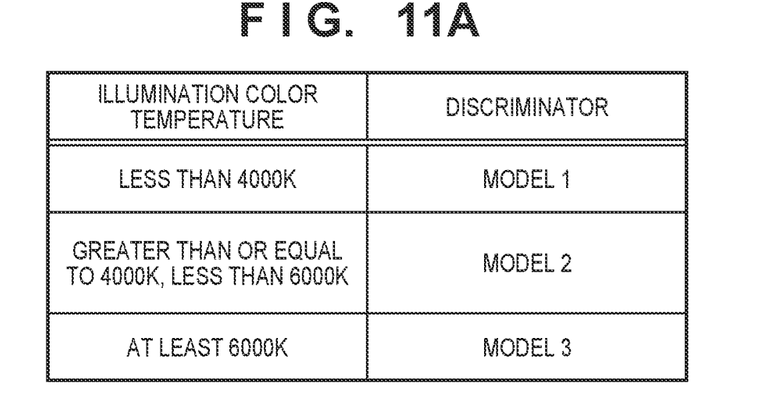
FIGS. 11A and 11B are diagrams showing tables representing examples of correspondence between imaging conditions and discriminator.

For example, in a case where the color temperature is adopted as the imaging condition, the living body determination unit 306 has a table illustrated in the FIG. 11A. Then, the discriminator to be actually used is decided in accordance with the color temperature acquired by the imaging condition acquisition unit 802. In FIG. 11A, a model 1 is a discriminator having learned by imaging data under illumination with a color temperature 3000 K, a model 2 is a discriminator having learned by imaging data under illumination with a color temperature 5000 K, and a model 3 is a discriminator having learned by imaging data under illumination with a color temperature 6500 K. The living body determination unit 306 refers to the table in FIG. 11A and decides that model 1 is used as the discriminator when the illumination color temperature in the imaging environment acquired by the imaging condition acquisition unit 802 is less than 4000 K, model 2 is used as the discriminator when the illumination color temperature is equal to or greater than 4000 K and less than 6000 K, and model 3 is used as the discriminator when the illumination color temperature is equal to or greater than 6000 K. In this way, the imaging condition of the video of the determination target and the imaging condition of the imaging data having been used for learning of the discriminator is close to each other, and the determination can be performed with higher accuracy.

Figure 11B:
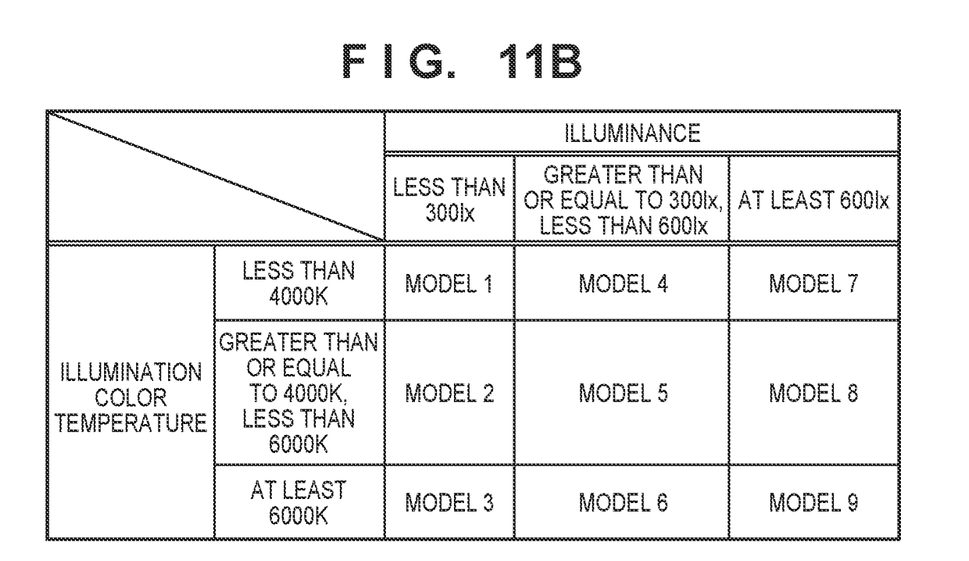

Alternatively, the discriminator to be used may be decided based on a combination of a plurality of the imaging conditions. FIG. 11B is an example of a table in a case where the discriminator is decided by a combination of the illumination color temperature and the illuminance. For example, when the illumination color temperature and the illuminance acquired by the imaging condition acquisition unit 802 are 5000 K and 700 1x, respectively, the living body determination unit 306 decides that the model 8 is used as the discriminator by referring to the table in FIG. 11B.

Figure 9:
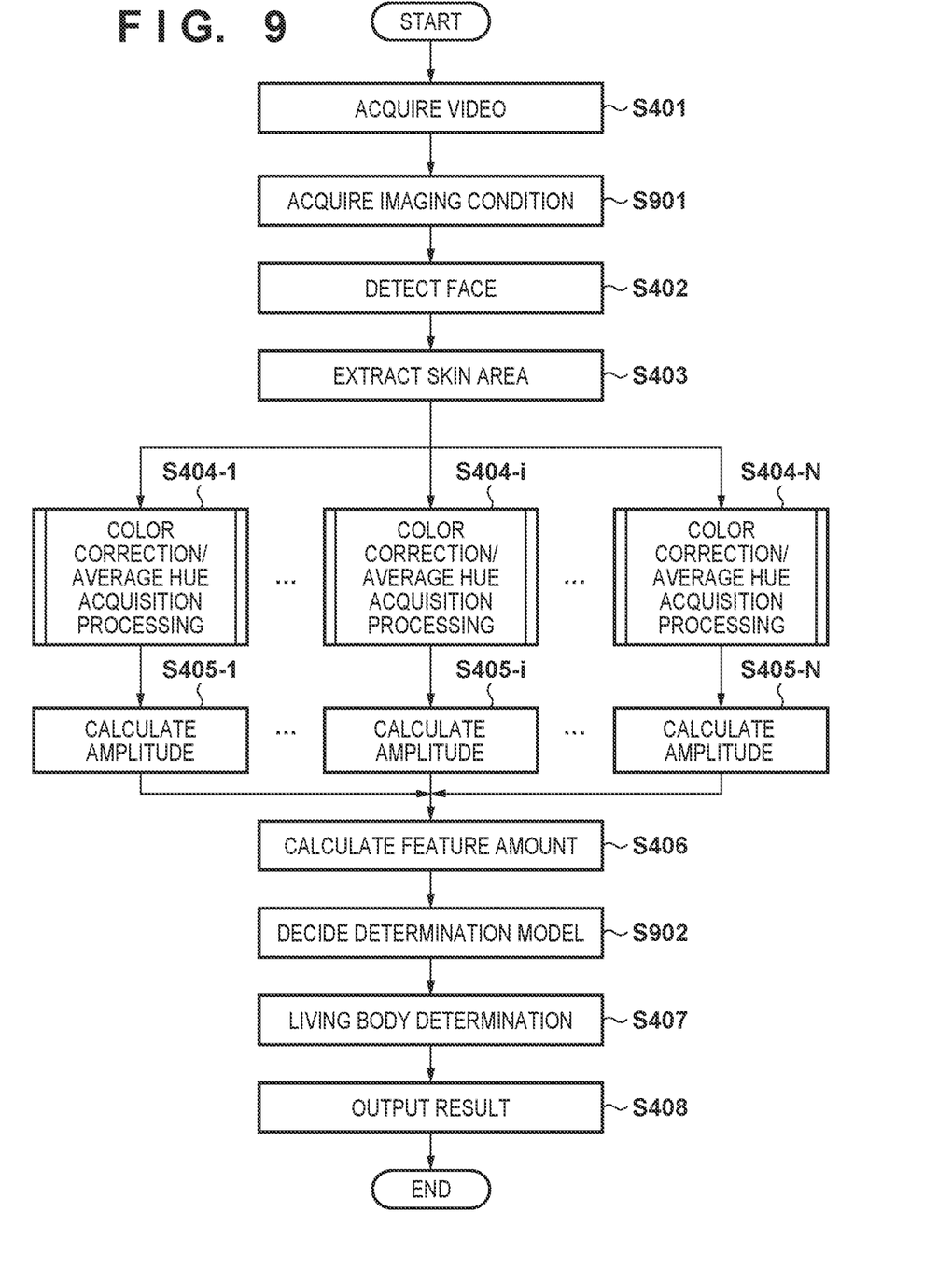
FIG. 9 is a flowchart illustrating a processing procedure of the video processing apparatus according to the second embodiment.

FIG. 9 is a flowchart illustrating processing executed by the video processing apparatus 100 according to the second embodiment. Hereinafter, a flow of the living body determination processing of the video processing apparatus 100 according to the second embodiment will be described with reference to FIG. 9.

Since each step in S401 to S406 and S408 is the same as the step of the same reference numeral in FIG. 4, description thereof will be omitted.

In S901, the imaging condition acquisition unit 802 acquires the imaging condition from the imaging condition acquisition apparatus 801.

In S902, the living body determination unit 306 decides the discriminator to be used for determination based on the imaging condition acquired in S901.

In S407, the living body determination unit 306 performs the living body determination using the determinator decided in S902, and acquires the living body determination result indicating whether the object is a living body or a non-living body. The determination method is similar to the first embodiment. However, there is a difference in that the discriminator decided in the S902 is used as the discriminator.

As described above, according to the second embodiment, the accuracy of the living body determination can be further increased in addition to effects of the first embodiment by performing the living body determination in consideration of the imaging condition of the video.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-103907, filed Jun. 28, 2022, which is hereby incorporated by reference herein in its entirety.

What is claimed is:
1. A video processing apparatus, comprising:
a processor; and
a memory storing instructions which, when read and executed by the processor, cause the apparatus to function as:
a correction unit configured to correct each of a plurality of frames constituting a video data based on a correction coefficient for correcting to colors of a plurality of target hues different from each other; and
a determination unit configured to determine whether an object is a living body based on an average hue value of a skin area of the object in each of the plurality of frames being corrected,
when the number of the plurality of target hues is n, and an i-th ($1 \leq i \leq N$) target hue among the plurality of target hues is defined as tagH(i),
the determination unit acquires determination result of a living body by
performing processing to obtain, as an amplitude value amp(H(i)) of the target hue tagH(i), a difference between a maximum value and a minimum value of the hue of the skin area of the video data of the target hue tagH(i) generated by the correction unit,
obtaining a total sum of an amplitude values amp(H(1)) to amp(H(N)),
obtaining amp_r(H(1)) to amp_r(H(N)) representing ratios by dividing each of the amplitude values amp(H(1)) to amp(H(N)) by the total sum, and supplying the amp_r(H(1)) to amp_r(H(N)) to a discriminator that determines whether a living body is a living body learned in advance.

2. The apparatus according to claim 1, further comprising a decision unit configured to decide the correction coefficient for approximating a color of the skin area in each of the plurality of frames constituting the video data to a predetermined target hue.

3. The apparatus according to claim 2, wherein
when the number of the plurality of target hues is n, and an i-th (1≤i≤n) target hue among the plurality of target hues is defined as tagH(i),
the decision unit
decides a color represented by average values aveR, aveG, and aveB of values of respective color components of all pixels in a skin area of a predetermined representative frame in the video data as a color of the skin area, and
decides Ar, Ag, and Ab that are ratios between the color component values aveR, aveG, and aveB representing the color of the skin area and the color component values tagR, tagG, and tagB representing the color of the target hue tagH(i) as the correction coefficients of the target hue tagH(i), and
the correction unit generates a frame for the target hue tagH(i) by multiplying a value of each color component of RGB of pixels in the skin area of the plurality of frames by the correction coefficients Ar, Ag, and Ab of the respective components being decided.

4. The apparatus according to claim 1, wherein the plurality of target hues are values representing directions represented by predetermined angle increments when a direction of an R component is 0°, a direction of a G component is 120°, and a direction of a B component is 240°.

5. The apparatus according to claim 1, further comprising an extraction unit configured to extract a skin area of the object from each of the plurality of frames constituting the video data, wherein
the correction unit corrects, based on the correction coefficient, the skin area being extracted.

6. The apparatus according to claim 1, wherein the extraction unit acquires the skin area corresponding to the face of the object from the video data.

7. The apparatus according to claim 1, further comprising
an acquisition unit configured to acquire information representing an imaging condition when the video data is imaged;
a plurality of discriminators corresponding to imaging conditions different from each other; and
a selection unit configured to select one of the plurality of discriminators based on the information acquired by the acquisition unit, wherein
the determination unit performs living body determination using the discriminator selected by the selection unit.

8. The apparatus according to claim 7, wherein the imaging condition includes a color temperature and illuminance of illumination used when the video data is acquired.

9. A method of controlling a video processing apparatus, the method comprising:
correcting each of a plurality of frames constituting a video data based on a correction coefficient for correcting to colors of a plurality of target hues different from each other; and
determining whether an object is a living body based on an average hue value of a skin area of the object in each of the plurality of frames being corrected,
when the number of the plurality of target hues is n, and an i-th (1≤i≤N) target hue among the plurality of target hues is defined as tagH(i),
in the determining, determination result of a living body is acquired by
performing processing to obtain, as an amplitude value amp(H(i)) of the target hue tagH(i), a difference between a maximum value and a minimum value of the hue of the skin area of the video data of the target hue tagH(i) generated in the correcting,
obtaining a total sum of an amplitude values amp(H(1)) to amp(H(N)),
obtaining amp_r(H(1)) to amp_r(H(N)) representing ratios by dividing each of the amplitude values amp(H(1)) to amp(H(N)) by the total sum, and
supplying the amp_r(H(1)) to amp_r(H(N)) to a discriminator that determines whether a living body is a living body learned in advance.

10. A non-transitory computer-readable storage medium storing a program which, when read and executed by a computer, causes the computer to perform a method of controlling a video processing apparatus, the method comprising:
correcting each of a plurality of frames constituting a video data based on a correction coefficient for correcting to colors of a plurality of target hues different from each other; and
determining whether an object is a living body based on an average hue value of a skin area of the object in each of the plurality of frames being corrected,
when the number of the plurality of target hues is n, and an i-th (1≤i≤N) target hue among the plurality of target hues is defined as tagH(i),
in the determining, determination result of a living body is acquired by
performing processing to obtain, as an amplitude value amp(H(i)) of the target hue tagH(i), a difference between a maximum value and a minimum value of the hue of the skin area of the video data of the target hue tagH(i) generated in the correcting,
obtaining a total sum of an amplitude values amp(H(1)) to amp(H(N)),
obtaining amp_r(H(1)) to amp_r(H(N)) representing ratios by dividing each of the amplitude values amp(H(1)) to amp(H(N)) by the total sum, and
supplying the amp_r(H(1)) to amp_r(H(N)) to a discriminator that determines whether a living body is a living body learned in advance.

* * * * *